United States Patent [19]
Goodman

[11] Patent Number: 6,110,318
[45] Date of Patent: Aug. 29, 2000

[54] SYSTEM FOR SELECTIVE ELECTRON BEAM IRRADIATION

[75] Inventor: Daniel L. Goodman, Lexington, Mass.

[73] Assignee: Science Research Laboratory, Somerville, Mass.

[21] Appl. No.: 08/979,271

[22] Filed: Nov. 26, 1997

[51] Int. Cl.[7] ............................. B32B 31/28; B29C 71/04
[52] U.S. Cl. ..................................... 156/272.2; 156/275.5; 156/275.7; 156/379.6; 219/121.29; 219/121.3; 250/492.3; 250/397; 250/400
[58] Field of Search ............................. 156/275.5, 275.7, 156/272.2, 351, 350, 378, 379.6, 539; 264/406, 485, 494; 219/121.12, 121.28, 121.29, 121.3, 121.35; 427/596; 425/174.4; 118/620; 250/397, 400, 492.1, 493.3

[56] References Cited

U.S. PATENT DOCUMENTS

| | | | |
|---|---|---|---|
| 3,463,900 | 8/1969 | Downing | 219/121.3 |
| 3,483,350 | 12/1969 | Pohl | 219/121.3 |
| 3,641,342 | 2/1972 | Armel et al. | 250/52 |
| 4,117,340 | 9/1978 | Goto et al. | 250/400 |
| 4,164,640 | 8/1979 | Scheffels | 219/121 |
| 4,229,639 | 10/1980 | Koy et al. | 219/121 |
| 4,278,866 | 7/1981 | Nevins et al. | 219/121 |
| 4,342,793 | 8/1982 | Skinner | 427/44 |
| 4,376,886 | 3/1983 | Sciaky et al. | 219/121 |

(List continued on next page.)

OTHER PUBLICATIONS

Campbell et al., "Electron Beam Curing Studies of Selected Thermosetting Adhesives," 23rd International SAMPE Symposium, Proceedings 23, pp. 1111–1114, 1978.

Cleland, "High Power Electron Accelerators for Industrial Radiation Processing," *Radiation Processing of Polymers*, Ch. 3, pp. 23–49, Singh et al. Eds., Hanser Publishers, New York, 1992.

Goodman et al., "Composite Curing With High Energy Electron Beams," 41st International SAMPE Symposium, Proceedings pp. 207–219, Mar. 24–28, 1996.

Vastava et al., "E–Beam Processing of Composite Structures," 42nd International SAMPE Symposium, Proceedings pp. 526–536, May 4–8, 1997.

*Primary Examiner*—Michael W. Ball
*Assistant Examiner*—Michael A Tolin
*Attorney, Agent, or Firm*—Theresa A. Lober

[57] ABSTRACT

Provided is the ability to selectively irradiate a designated irradiation target portion of a target material with a beam of electrons. Target material is moved at a substantially constant velocity in one direction along a path that is intersected by an electron beam. The electron beam is translated in a direction transverse to the direction of the target material movement to intersect the designated portion of the target. This enables the designated target portion, e.g., a target irradiation path, to be followed by the electron beam as the target material moves past the beam. Also provided is control of electron beam dose delivered to the designated irradiation target portion. Here, as a target material is moved along the path, the electron beam is also scanned in a direction parallel with the direction of target material movement to control the electron beam dwell time at points along the designated irradiation target portion, to deliver a specified electron beam dose to points along the designated portion of the target material. This scanning can control the electron beam dwell time to deliver a substantially uniform electron beam dose or to deliver an electron beam dose that falls within a specified range of allowable electron beam doses. Also provided is the ability to control the electron beam in response to feedback signals. Here the actual position of the electron beam intersection with the target is detected, and the electron beam translation is adjusted in response to the detected intersection position to maintain intersection of the electron beam with the designated portion of the target material. Additionally, the electron beam scanning can be adjusted in response to the detected intersection position to maintain delivery of the specified electron beam dose to the designated target portion. Preferably, sensors are positioned in a spaced relationship with the designated target portion, e.g., on the target material, in a configuration that defines the designated portion as a path between the sensors.

26 Claims, 6 Drawing Sheets

U.S. PATENT DOCUMENTS

| | | | |
|---|---|---|---|
| 4,484,341 | 11/1984 | Luniewski | 378/69 |
| 4,585,943 | 4/1986 | Yasuda et al. | 250/396 |
| 4,591,688 | 5/1986 | Koch et al. | 219/121 |
| 4,973,818 | 11/1990 | Bittenbrünn et al. | 219/121.28 |
| 5,099,133 | 3/1992 | Yamada | 250/492.2 |
| 5,338,588 | 8/1994 | Billiu | 428/36.3 |
| 5,610,406 | 3/1997 | Kai et al. | 250/492.22 |
| 5,659,223 | 8/1997 | Goodman | 315/39 |

SYSTEM FOR SELECTIVE ELECTRON BEAM IRRADIATION

BACKGROUND OF THE INVENTION

This invention relates to techniques for irradiating materials with an electron beam, and more particularly relates to techniques for selectively controlling the delivery of electron beam radiation to a material being processed.

Electron beam (E-beam) irradiation techniques are employed in an increasingly wide range of manufacturing and processing applications, including, for example, medical, consumer, automotive, military, and aerospace applications. For many production applications, E-beam irradiation techniques are superior alternatives to conventional thermal-based processing for accomplishing various manufacturing steps. Such is the case for, e.g., E-beam welding, as well as for the class of E-beam curing applications including E-beam polymerization of composites and E-beam polymerization of bonding adhesives.

In a typical E-beam welding operation, the junction between two abutting metal parts to be welded together is exposed to a beam of electrons to melt the junction and fuse the parts together upon cooling. E-beam polymerization, i.e., curing, operations typically involve the exposure of a radiation-curable polymer-based material to a beam of electrons to cross-link the polymer and thereby cure the material. This radiation curing process can be employed, for example, for curing a structural part formed of a radiation-sensitive, fiber-reinforced polymer matrix composite. The radiation curing process can also be employed, for example, in a bonding operation in which a radiation-curable polymer adhesive that is applied to junctions of a structural assembly is exposed to a beam of electrons to cure the adhesive and thereby bond together the components of the assembly.

E-beam curing processes such as these provide substantial cost and efficiency advantages, particularly in a production environment, and notably because the E-beam curing of a polymer matrix composite or polymer adhesive can be accomplished in a time that is typically greatly reduced from that required for conventional thermal curing. In addition, because E-beam curing can be accomplished at room temperature, it enables high manufacturing throughput, reduced residual stress in processed materials, accommodation of material assemblies that include temperature-sensitive materials such as plastics, and elimination of volatile organic by-product release during the cure. Furthermore, because an E-beam can penetrate many materials, complicated multi-material assemblies can be bonded in an E-beam process where the assembly adhesive is not exposed and the E-beam is directed through the assembly to an internal location of E-beam sensitive material to be cured.

For many E-beam curing applications, it is preferable to irradiate only selected portions of a material or an assembly. For example, in a bonding application, irradiation is generally required only along the adhesive bond lines of the assembly, and typically the bond lines are of an area that is only a small fraction of the total surface area of the assembly; irradiation of the entire assembly is thus unnecessary. The inefficiency of E-beam radiation of the entire assembly area reduces process throughput and increases process cost. In a polymer matrix curing application, multiple polymer resins may be employed in the same part or assembly of parts, with each resin possibly requiring a distinct E-beam polymerization dose. A uniform irradiation of all resins could result in damage or inoperability of the part or assembly. It is clear that for these example E-beam applications as well as other various applications, blanket irradiation of a part or assembly often produces only suboptimal process products and substantially reduces process efficiency.

SUMMARY OF THE INVENTION

The invention provides the ability to selectively irradiate a designated irradiation target portion of a target material or target part with a beam of electrons. In accordance with the invention, the target material is moved at a substantially constant velocity in one direction along a path that is intersected by an electron beam. The electron beam is translated in a direction transverse to the direction of the target material movement to intersect the designated portion of the target. This enables the designated target portion, e.g., a target irradiation path, to be followed by the electron beam as the target material moves past the beam.

The invention also provides the ability to control the electron beam dose delivered to the designated irradiation target portion of a target material. For many applications, an ability to control electron beam position has very little value if uncontrolled electron beam dose is a required accommodation. The invention eliminates the need for such accommodation and enables a high level of efficiency and precision in electron beam irradiation applications, and particularly for many manufacturing processes.

In accordance with the invention, as a target material is moved along a path that is intersected by an electron beam, and the electron beam is translated in the manner described above, the electron beam is also scanned in a direction parallel with the direction of target material movement to control the electron beam dwell time at points along the designated irradiation target portion, to deliver a specified electron beam dose to points along the designated portion of the target material. This scanning can be employed to control the electron beam dwell time to deliver a substantially uniform electron beam dose along the designated portion, or to deliver an electron beam dose that falls within a specified range of allowable electron beam doses.

In embodiments provided by the invention, the scanning of the electron beam is carried out by controlling the rate at which the electron beam is scanned in a direction parallel with the direction of movement of the target material. This scan rate control can be implemented by imposing a fixed scan rate selected from a set of specified, fixed scan rates. Each specified, fixed scan rate is imposed at more than one point along the designated portion to be irradiated, e.g., on a corresponding region of the designated portion to be irradiated. Preferably, each of the specified, fixed scan rates is selected to minimize the ratio of maximum electron beam dose to minimum electron beam dose delivered to points along the corresponding region for that scan rate. The scan rates can be selected to reduce the velocity of the electron beam relative to the target material in large-slope regions of the designated portion to be irradiated, and selected to increase the velocity of the electron beam relative to the target material in small-slope regions of the designated portion to be irradiated. A large-slope region is defined here as a region the tangent of which intersects a line parallel to the direction of the target material movement at an acute angle greater than about 60°. Similarly, a small-slope region is defined as a region the tangent of which intersects a line parallel to the direction of the target material movement at an acute angle less than about 30°.

In other embodiments provided by the invention, the scanning of the electron beam is carried out by controlling the maximum angle to which the electron beam can be scanned. This maximum scan angle is selected, e.g., based on a specified electron beam dose uniformity to be imposed along the designated portion of the target material. Here, the maximum electron beam scan angle can be specified for a specified electron beam dose uniformity that is defined by an allowable electron beam dose range ratio, R, of maximum allowable electron beam dose, $D_{max}$, to minimum allowable electron beam dose, $D_{min}$. This results in the specification of a maximum electron beam scan angle, $\Delta\theta_{max}$, given as $$\Delta\theta_{max} = \frac{1}{R}\Delta\theta_{max\text{-}uniform};$$

where $\Delta\theta_{max\text{-}uniform}$ is a maximum electron beam scan angle required to deliver a substantially uniform electron beam dose along the designated portion of the target material.

The invention also provides the ability to control the electron beam in response to feedback signals. In this scenario, the actual position of the electron beam intersection with the target is detected, and the electron beam translation is adjusted in response to the detected intersection position to maintain intersection of the electron beam with the designated portion of the target material. In addition or alternatively, the electron beam scanning can be adjusted in response to the detected intersection position to maintain delivery of the specified electron beam dose to the designated portion of the target material. Preferably, sensors are positioned in a spaced relationship with the target material's designated portion, e.g., by positioning of sensors on the target material, in a configuration that defines the designated portion as a path between the sensors. The distance from path of the target material to the source of the electron beam can be selected to produce a generally circular intersection of the electron beam with the designated path on the target material. The electron beam intersection is preferably characterized by a beam diameter that is larger than the width of the designated path on the target material.

These techniques can be applied to a method for bonding together two materials by selectively irradiating with a beam of electrons a designated bond line of electron beam-curable adhesive that is located at a junction of the two materials. The two materials are moved at a substantially common and constant velocity in one direction along a path that is intersected by an electron beam. Here the electron beam is translated in a direction transverse to the direction material movement to intersect the designated adhesive bond line. The electron beam is also scanned in a direction parallel with the direction of material movement to control the electron beam dwell time at points along the designated adhesive bond line to deliver a specified electron beam dose to points along the designated adhesive bond line. The energy of the electron beam can be controlled to produce an electron beam having energy sufficient to substantially traverse one of the materials to impinge a designated adhesive bond line located between the materials.

The invention provides systems and components for carrying out all of the techniques described above. Also provided is a method for configuring feedback sensors on a target material to be selectively irradiated with a beam of electrons. A pair of conducting plate sensors is positioned on the target material in a spaced alignment to define an irradiation target path between the conducting plate sensors. The sensors are connected to a detector that is configured in a feedback loop to detect electron current level generated in the sensors when the beam of electrons impinges the sensors.

Multiple pairs of conducting plate sensors can be positioned on the target material, with each pair defining a segment of the irradiation target path. A bias voltage can be applied to the conducting plate sensors to suppress secondary electron emission from the sensors when the beam of electrons impinges the sensors. Feedback processing can be carried out by determining the difference in electron current level between plate sensors in a designated pair of sensors.

The electron beam irradiation techniques and corresponding equipment provided by the invention find applicability to a wide range of manufacturing processes in which a material or part is to be irradiated with an electron beam. Substantial efficiencies, such as cost reduction and throughput increase, are enabled the invention for many electron beam irradiation processes that heretofore were impractical due to the inefficiencies of conventional processes. Other features and advantages of the invention will be apparent from the claims, and from the following description and accompanying drawings.

DETAILED DESCRIPTION OF THE INVENTION

Figure 1:
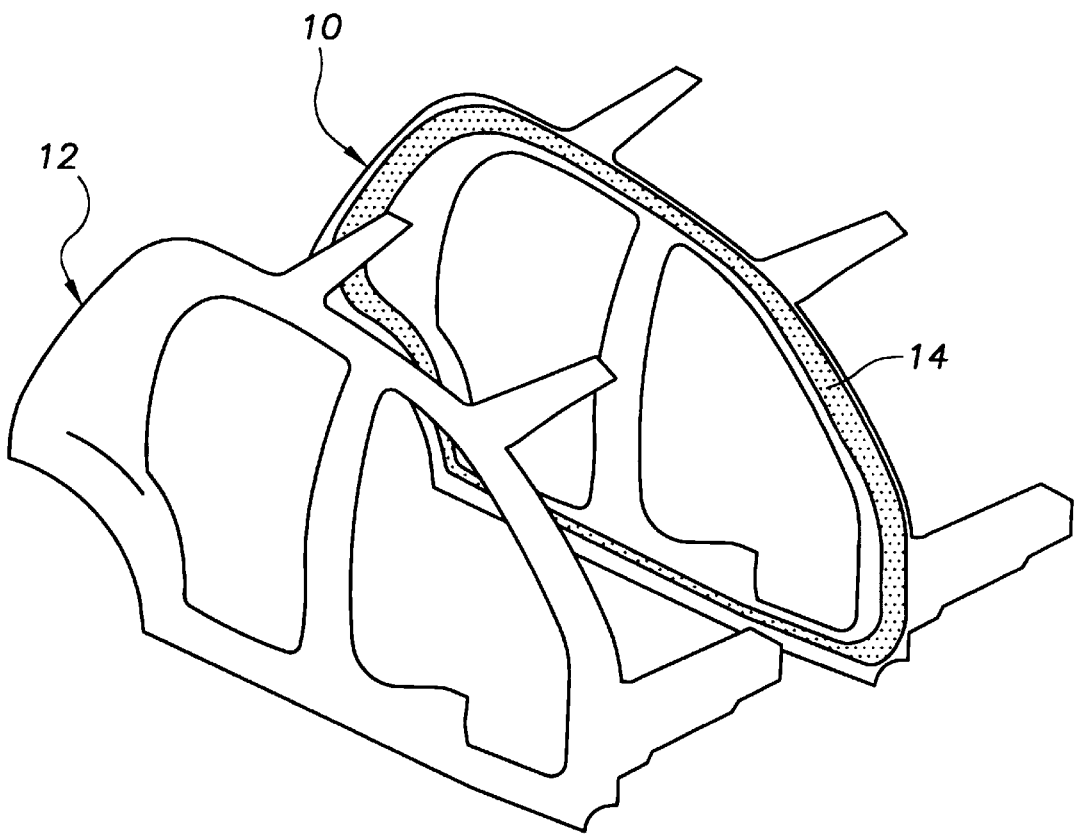
FIG. 1 is a schematic perspective view of two automotive side panels to be bonded together by an E-beam irradiation process provided by the invention.

FIG. 1 schematically illustrates an example selective E-beam irradiation application addressed by the invention, here an example E-beam curing process for bonding together two parts by way of E-beam polymerization of a polymer adhesive. The example parts to be bonded together include an inner side panel 10 and an outer side panel 12 of an automotive body. Frequently, automotive body parts such as side panels are built as hollow sections in order to increase the sections' stiffness. Such sections can be formed by injection molding of inner and outer panels and bonding together of the molded panels. Although automotive panels are specifically shown in the figure it is to be understood that the example E-beam adhesive curing application being described is not limited to a particular part or class of parts.

A layer 14 of adhesive is applied on at least one of the parts, e.g., the inner panel 10 as-shown, along a selected surface path that will mate with the other panel to form a bond line between the parts. The selected adhesive path, or bond line, is thus a custom function of the particular geometry of the parts to be bonded. The applied adhesive is a radiation-sensitive polymer adhesive, and therefore its bond line defines an irradiation path along which an E-beam preferably is substantially entirely directed to cure the adhesive. One suitable radiation-sensitive adhesive that can be employed is the Loctite Adhesive #334, available from the Loctite Corp., of Newington, Conn. As can be recognized, a wide range of radiation-sensitive adhesives can be employed, including adhesives that are partially cured both by E-beam exposure as well as thermal processing, e.g., polymer resin adhesives similar to that described by Skinner in U.S. Pat. No. 4,342,793, issued Aug. 3, 1982, and the entirety of which is hereby incorporated by reference.

Figure 2:
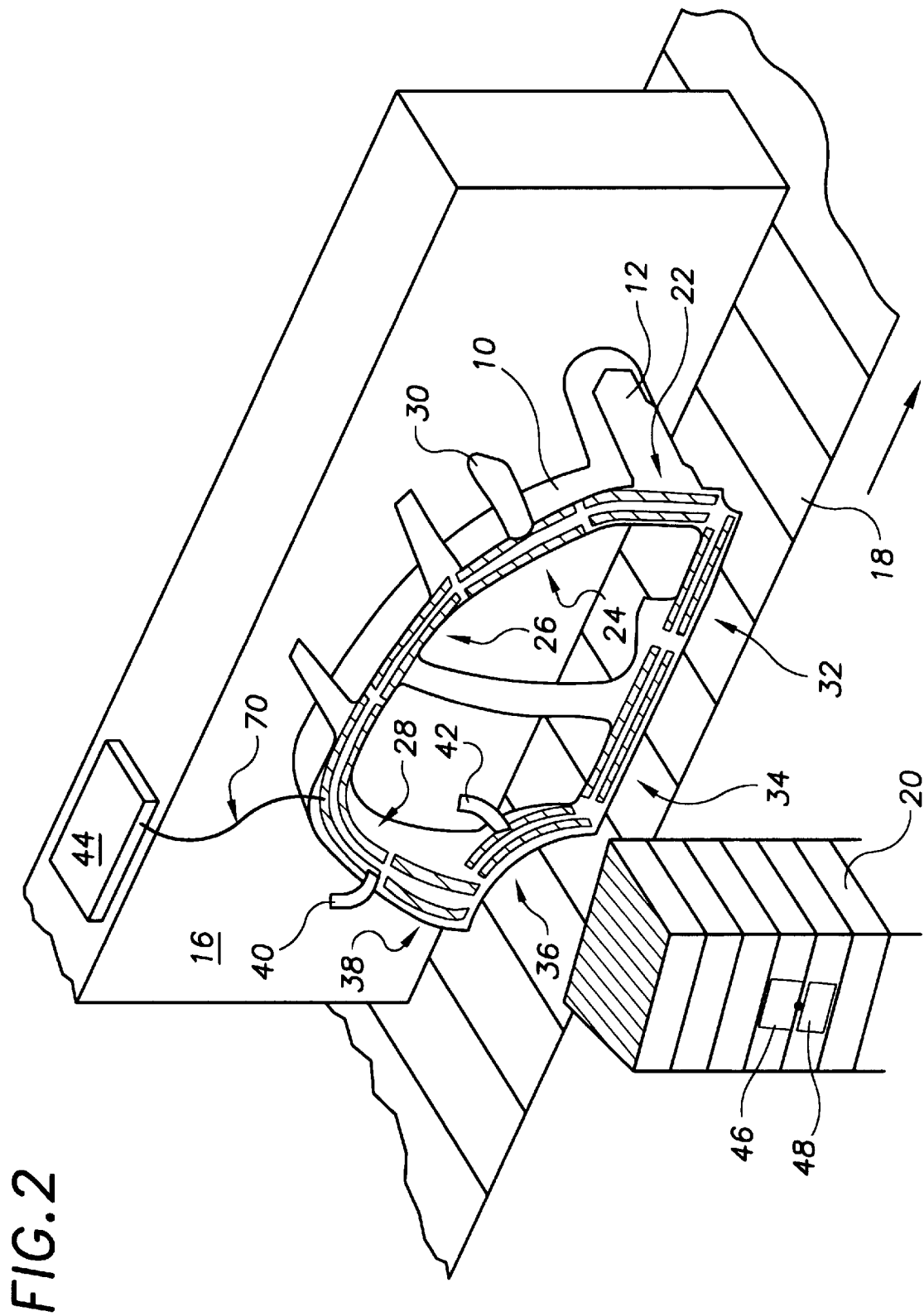
FIG. 2 is a schematic perspective view of the side panels of FIG. 1, here shown configured with support tooling on a conveyor belt to pass before an E-beam production unit in accordance with the invention.

Referring also to FIG. 2, in a process for bonding together the inner and outer panels once adhesive has been applied, the two panels 10, 12, are aligned, brought together in contact, and held fixed in position with respect to each other using, e.g., tooling and a tooling support structure 16. The panels and tooling support structure are positioned on a moving conveyor belt 18 for passing in front of an E-beam production unit 20 which directs an E-beam at the part to polymerize the adhesive and thereby bond together the two panels.

A wide range of tooling configurations can be employed for maintaining the panels' respective positions during the E-beam exposure. In one example configuration, plates such as the plate pairs 22, 24, 26, 28, 32, 34, 36, and 38 as-shown, are positioned on the outer surface of the outer panel 12 to cooperate with corresponding brackets 30, 40, 42 mounted in the tooling support structure 16 to hold the panels in position from an edge of the panels. For clarity, only three brackets are illustrated, but it is to be understood that one bracket is provided for each plate or for each plate pair, as selected, and discussed further below. The brackets can be configured as spring-loaded brackets, as pinching clamps, or in another suitably convenient configuration that provides support for maintaining the panels together. The brackets can be bolted or otherwise connected to the support structure 16. As can be recognized, a wide range of other tooling configurations can be employed; the invention is not limited to a specific tooling arrangement.

In a preferred configuration provided by the invention, the plate pairs 22, 24, 26, 28, 32, 34, 36, 38, function not only as tooling but also as E-beam feedback sensors, or detectors, to be employed in a technique for detecting and controlling the trajectory of the E-beam along the adhesive bond line of the panels. In this scenario, the plates preferably are formed of a conducting metal such as aluminum or steel, and are electrically insulated from one another. Signals from the detectors are sent, e.g., by way of a transmitter 44, to a receiver 46 provided with the E-beam production unit 20 and connected to a controller 48 for controlling the E-beam trajectory. As explained in detail below, depending on a selected feedback technique, the detectors can be provided as a single pair rather than multiple separated pairs as shown, in which case in FIG. 2 each of the eight outer plates would be connected and each of the eight inner plates would be connected. Other features of the detecting plates will be described below.

Figure 3:
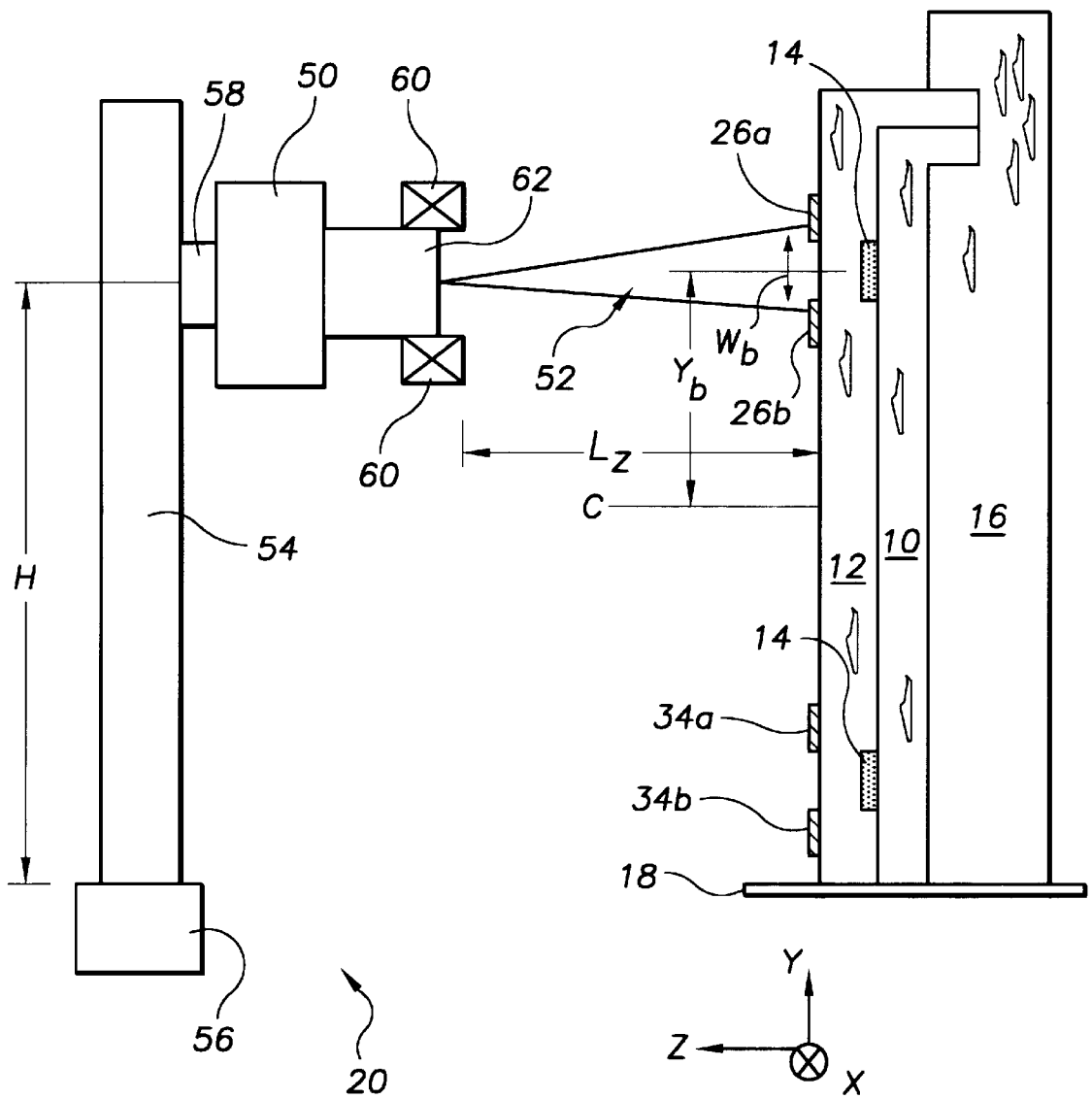
FIG. 3 is a schematic side view of the side panel and E-beam production unit configuration of FIG. 2.

Turning also to FIG. 3, schematically illustrating a side view of the E-beam irradiation configuration, a coordinate system is defined as shown, with the −X direction taken as that direction along which the conveyor belt 18 travels, i.e., out of the page toward the viewer in FIG. 3, with the +Y direction taken as being toward the top in the drawing, and with the +Z direction taken as being toward the left in the drawing. In the figure, the configuration of inner and outer panels 10, 12, respectively, is shown abutting the tooling support structure 16 on the conveyor belt 18. Two of the pairs of front tooling and detector plates are shown, here designated as a first pair 26a, 26b, and a second pair 34a, 34b. For clarity, not shown is the tooling brackets that hold the panels and front plates against the tooling support structure. The radiation-sensitive adhesive 14 is shown at two points along the bond line path of FIG. 1. Although the outer panel 12 is shown here having indentations to accommodate the adhesive, it is to be understood that this is not in general required.

The E-beam production unit 20 includes an E-beam gun 50 that accelerates a beam 52 of electrons toward a target material or target part or parts such as the automotive panels. Preferably, the E-beam 52 is of an energy sufficient to penetrate the outer panel 12 in order to deliver the E-beam to the adhesive 14 for curing the adhesive and bonding the panels 10, 12, together. For a wide range of applications, an E-beam energy of between about 1 MeV and about 10 MeV is sufficient for penetrating through, e.g., a composite panel of up to about 2 cm in thickness. One example suitable E-beam gun with this capability is the SNOMAD-IV Linac from Science Research Laboratory, Inc., of Somerville, Mass.

A vertical E-beam deflection system, e.g., a translator such as a linear translator 54, is provided to move the E-beam gun in the ±Y direction to thereby vary the height, H, of the E-beam gun, at a desired and variable velocity. The translator 54 is configured, e.g., with a ball screw to convert the rotational motion of a stepper motor 56 to linear vertical motion. The translator is connected to the E-beam gun 50 by way of a carriage 58 that supports the gun during translation. An example suitable translation system is the PowerSlide System from Thompson Co., of Port Washington, N.Y.

A second E-beam deflector, e.g., a magnetic coil 60, is provided to produce a magnetic field in the ±Y direction for directing the electron beam at an angle θ with respect to a line parallel to the Z axis and extending from the center of the E-beam output window 62. The beam is extracted out of this window 62, from vacuum into air, through, e.g., a thin titanium foil window or other suitable configuration, e.g., such as that described by Goodman in U.S. Pat. No. 5,659,223, issued Aug. 19, 1997, and the entirety of which is hereby incorporated by reference. Once exiting the window, the beam 52 propagates a distance L, to the target part in the −Z direction. Upon reaching the target, the beam has expanded to a generally circular shape having a beam diameter, $w_b$, that is a function of the beam's scattering with air molecules during the extent of its propagation trajectory. Preferably, the E-beam production unit 20 and the conveyor belt 18 are positioned with respect to each other such that the beam diameter, $w_b$, at the target part is slightly larger than the width of the adhesive bond line 14. Although this configuration slightly decreases beam utilization efficiency, it enables the E-beam feedback technique provided by the invention and described below.

Figure 4:
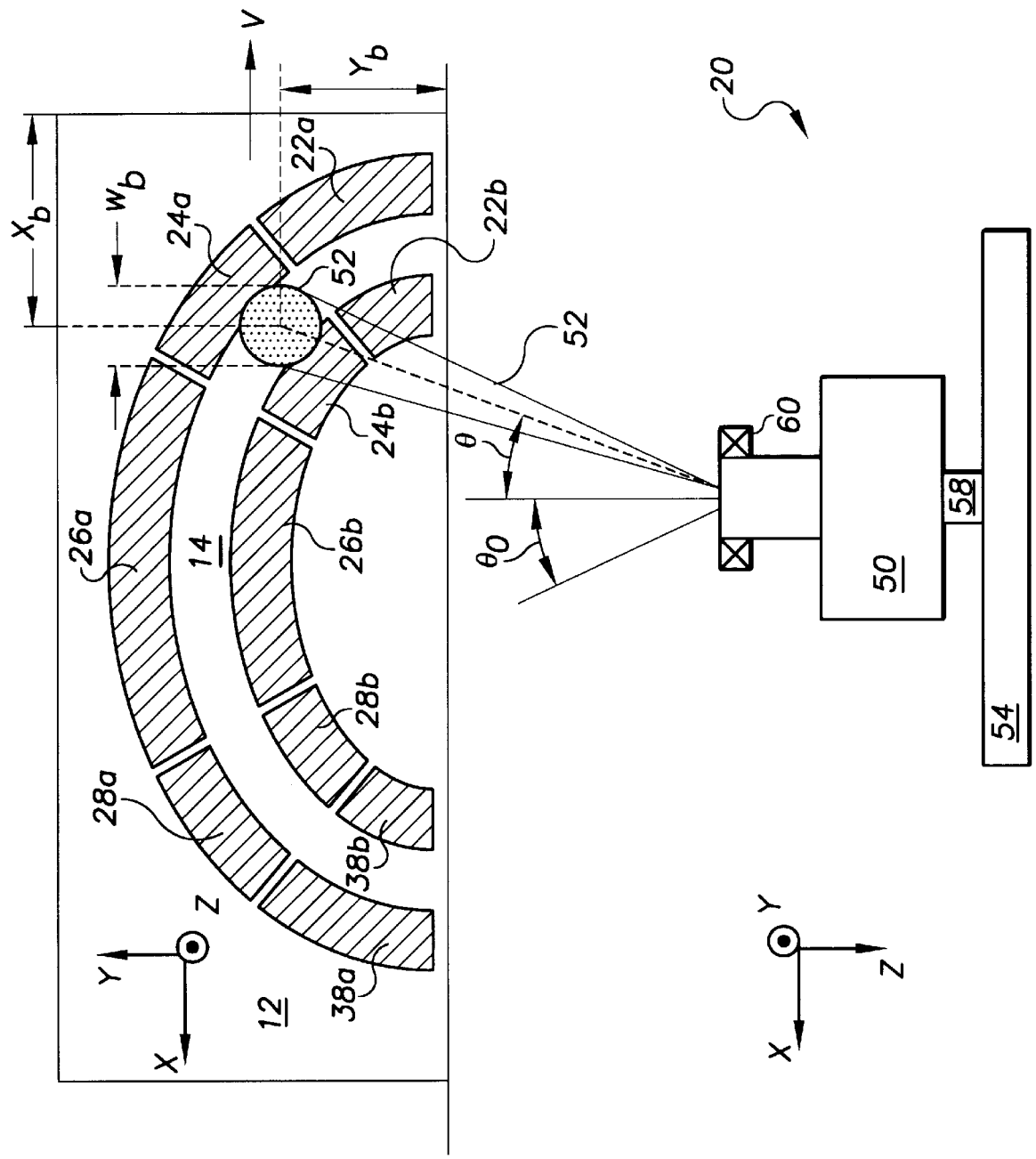
FIG. 4 is a schematic multi-view of the E-beam production unit delivering an E-beam to an irradiation path of the side panels of FIG. 2 in accordance with the invention.

FIG. 4 provides a schematic multi-view illustration of the E-beam coordinates as the E-beam is controlled to selectively irradiate the moving target panel in accordance with the invention. In the lower section of FIG. 4 is shown a top-down view of the E-beam production unit 20 as an E-beam 52 is directed toward the target panel shown at the top section of the figure. The target panel is shown without detail in a head-on rather than top-down view, and is shown including the front plate pairs 22, 24, 26, 28, and 38 from FIG. 1 in a schematic representation of the curve formed by the plate pairs on the top half of the outer side panel 12 in FIG. 1. This plate pair curve corresponds to the location of the adhesive bond line 14 of the panels, in a manner described below for implementing a feedback technique.

As shown in general in FIG. 4, the E-beam trajectory with respect to the part being irradiated can be completely defined by a propagation angle, θ, given with respect to the Z-axis reference line defined above, and the X-axis and Y-axis positions of the beam. The X-axis E-beam position, $X_b$, on the target panel is taken in the +X direction referenced from the leading, i.e., right edge of the target panel, given that the panel is moving in the −X-direction. The Y-axis E-beam position, $Y_b$, on the target panel is taken in the +Y-direction referenced from the vertical midpoint of the panel, as shown in FIG. 3, where the vertical midpoint is indicated at the "C." Each of the $X_b$ and $Y_b$ measurements are made from the center of the beam diameter, $w_b$, on the target panel.

As explained above, for an E-beam adhesive bonding application, the adhesive bond line defines a preferable irradiation path along which an E-beam is to be directed; any direction of the E-beam to part locations other than the adhesive path is unnecessary and inefficient. This is also true, of course, for E-beam curing applications beyond bonding applications and for E-beam irradiation applications beyond curing applications.

In general, for any E-beam irradiation application, a designated irradiation portion of a target material, e.g., a preferred irradiation curve, or irradiation path, can be defined as that portion or path along which an E-beam is preferably directed to produce a desired result, e.g., polymerization, most efficiently. For example, the adhesive bond line 14 of FIG. 1 defines an irradiation path along which an E-beam is preferably directed to bond the panels together in a process that would be more efficient than a blanket E-beam exposure of the entire panels. Given that the automotive panels are moving in one direction during E-beam processing of the adhesive bond line, two passes of an E-beam would be required to address the entire path, one pass for the upper path section and one pass for the lower section, or alternatively two E-beam production units could be employed simultaneously to address the sections together.

In accordance with the invention, a vertical deflection system such as the translation system 54 of the E-beam production unit 20 in FIG. 3 is controlled to move the E-beam gun up and down in a pattern that follows a desired irradiation path on a part to be irradiated as the part moves past the E-beam gun. In the example E-beam adhesive curing process for the automotive panels, this control enables constraint of E-beam exposure to substantially only that path that includes the radiation-sensitive adhesive, and thereby minimizes the part processing time and processing cost required to effectively bond the panels together.

In a first scenario contemplated by the invention, the irradiation path to be followed by the E-beam is modeled with the E-beam Y-axis position given as a function of the E-beam X-axis position, i.e., $Y_b(X_b)$, for the irradiation path of interest, e.g., an adhesive bond line trajectory, with the variables $Y_b$ and $X_b$ defined as shown in FIG. 4. For example, for an elliptical irradiation path characterized by a major axis length, a, and a minor axis length, b, the E-beam Y-axis position can be defined as $$Y_b = b\sqrt{1 - X_b^2/a^2}.$$

The Y-axis translational control function can be given as a continuous function, but can of course include vertical line sections in which multiple Y-axis values are given for a single X-axis value.

With the irradiation path Y-axis function computed, the E-beam production unit controller 48 can be preprogrammed with this function in a conventional manner to carry out corresponding time-dependent height control, H(t), of the E-beam gun as the irradiation path on the target part passes by the E-beam gun during a run time production process. After a time, $t_0$, of irradiation initiation, and assuming only E-beam translation, the E-beam time-dependent translational control is then given as $H(t)=Y_b(X_b(t))$, where $X_b(t)=$ V·t, where V is the velocity of the conveyor belt.

In a second scenario contemplated by the invention, the preprogrammed Y-axis E-beam gun translation control can be modified in real time based on a real time feedback to the E-beam controller of the current E-beam position as the E-beam is directed to follow an irradiation path. As discussed above, the front face tooling plates used for securing the automotive target panel can be employed as detectors to detect the location of the beam. With this configuration, any deviation of the beam from its expected trajectory along the irradiation path can be corrected, in the manner described below, to more precisely maintain the preprogrammed Y-axis translation and corresponding irradiation path trajectory.

In an additional scenario contemplated by the invention, no Y-axis translation control preprogamming of the E-beam controller is employed, and instead, real time detection and feedback of the E-beam location on the target panel is employed to control the continuing movement of the E-beam along the desired irradiation path.

As the E-beam gun is translationally controlled to follow a prescribed irradiation path trajectory, the E-beam delivers a dose of electrons to each point along the path. The E-beam dose at a given point along the path is a function of various factors, including the power of the E-beam and the dwell time of the beam at the given point. E-beam dose, $D_0$, in kGy units, is given as:

$$D_o = \frac{I \cdot K_0 \cdot F_i}{\pi \cdot w_b \cdot V_1}; \tag{1}$$

where I is the E-beam current in mA, $K_0$ is a material-dependent area processing coefficient, $F_i$ is the geometric beam utilization efficiency, $w_b$ is the beam diameter in cm, and $V_1$ is the effective velocity of the E-beam along the irradiation path, in cm/s. The material-dependent area processing coefficient, $K_0$, and the geometric beam utilization efficiency, $F_i$, are both defined by Cleland in "High Power Electron Accelerators for Industrial Radiation Processing," in *Radiation Processing of Polymers*, Oxford University Press, 1992. For many polymeric materials, $K_0$ is about 1700 kGy cm²/(mA s), and for typical conveyor belt systems, $F_i$ is between about 0.8 to about 0.9. Expression (1) assumes a generally circular E-beam.

The effective E-beam scan velocity, $V_1$, is a function of the velocity, V, of the part being irradiated and the E-beam translational control velocity, dH/dt. Specifically, $$V_1 = \sqrt{(dX/dt)^2 + (dY/dt)^2} = (dX/dt)\sqrt{1 + (dY/dX)^2},$$

where dY/dt=(dY/dX/dt=V; for a given target part velocity, V. The dwell time of the E-beam at a given point along the path is given by the ratio of the E-beam width, $w_b$, to the effective scan velocity $V_1$, of the E-beam when the beam is located at the given point. Because the effective E-beam velocity changes along the path as a result of changing E-beam translation control velocity, dH/dt, as well as possible changes in the part velocity, V, the dwell time of the E-beam is point-dependent; in other words, the E-beam dwell time can be different for each point along the irradiation path and is a function of the translational control required to direct the E-beam to each point along the path.

Given that the E-beam dwell time changes along an irradiation path as the E-beam is directed to the points of the path, and given that the power delivered by the E-beam gun is not changed as the E-beam scans the path, then the E-beam dose delivered to the irradiation path is position-dependent and can be different for each point along the path. Expression (1) above explicitly shows, e.g., that as the effective E-beam velocity, $V_1$, increases, the delivered E-beam dose decreases.

But for many E-beam irradiation applications, a specified dose or some dose in an allowable range of doses must be delivered to all points of an irradiation path to produce a desired result. For example, in an E-beam adhesive curing application using the Loctite Adhesive 334 polymer adhesive described above, the delivery of a dose of at least between about 1 MR to about 2 MR is required to produce a cured state that is not a viscous liquid state, i.e., to produce a solid, fully-cured part. Furthermore, the Loctite Adhesive 334, as well as many other similar adhesives, contains unreacted acrylic monomers that in an uncured state can cause allergic reactions. Under-curing of a polymer material can thus usually not be tolerated for reasons of both product performance and health and safety. In addition, over-curing of a polymer resin can result in material degradation due to polymer chain scission. Over-curing also darkens a material. Thus, both material strength and cosmetic material appearance can be compromised by overcuring. For some applications, it is further preferred that a substantially singular, i.e., substantially uniform, E-beam dose be applied to all points of an irradiation path. For example, in an E-beam welding application, if the E-beam dose delivered to a joint to be welded is not uniform, the joint weld is found to include defects such as porosity, spiking, cracking, and cold shuts.

The invention provides a range of techniques for enabling the delivery of a prescribed uniform E-beam dose or some dose within in a range of allowable prescribed doses to all points along an irradiation path even as the E-beam dwell time is changed by the translational control employed for directing the E-beam along the path. This is accomplished in general in accordance with the invention by implementing and controlling a scan of the E-beam in a direction parallel with the motion of the target part. In one example technique for achieving this, the magnetic coils 60 of the E-beam (FIGS. 3 and 4) are controlled to produce an E-beam trajectory angle, $\theta$, that is a function of the E-beam X-axis and Y-axis positions, i.e., $\theta(X_b, Y_b)$, such that as the E-beam gun is vertically translated, it is also scanned in a direction parallel with the motion of the irradiation path.

The E-beam scanning is controlled to adjust the E-beam dwell time at each point of the irradiation path in a manner that accounts for the vertical E-beam translation and the target part motion such that a desired E-beam dwell time, and corresponding E-beam dose, is delivered to each point along the irradiation path. The invention thereby enables both precise directional control of an E-beam as well as precise E-beam dose control. For many applications, an ability to control E-beam position has very little value if uncontrolled E-beam dose is a required accommodation. The invention eliminates the need for such accommodation and enables a level of efficiency and precision in E-beam irradiation not previously achievable for many applications and particularly for many manufacturing processes.

Considering first a scenario in which a constant, uniform E-beam dose is to be delivered along an irradiation path; given that a target part to be irradiated along a selected irradiation path is moving at a velocity, V, e.g., on a conveyor belt, then for an irradiation path that is not purely vertical, a trajectory angle, $\theta(X_b, Y_b)$, is imposed on the E-beam in accordance with the invention and given as:

$$\theta(X_b, Y_b) = \tan^{-1}\left[\tan\theta_0 - \frac{X_b}{L_z} + \frac{V}{V_1 \cdot L_z}\int_0^{X_b}\sqrt{1 + (dY_b/dx)^2}\,dx\right]. \quad (2)$$

This trajectory angle expression results in a constant E-beam dose along the irradiation path when the E-beam vertical translation is controlled in the Y-direction to carry out the desired irradiation path. In expression (2) $L_z$ is the distance from the E-beam window to the target part and $V_1$ is the effective velocity of the E-beam along the irradiation path as defined above. Note that this expression is applicable to any irradiation path defined by $Y_b(X_b)$; it is not limited to a particular class of paths. The expression is not, of course, applicable to purely vertical path sections, however; that scenario is discussed below. When $V_1$ is set equal to the conveyor velocity, V, then the delivered E-beam dose specified by the expression is that dose which would be delivered without the E-beam trajectory angle control, and is point-dependent along the path.

As described further in detail below, the E-beam trajectory angles prescribed by expression (2) can be implemented to control the E-beam during a target part irradiation process. The expression produces a set of scan angles to be imposed on the E-beam during its scan of an irradiation path. With this control imposed, the time-dependent X-axis E-beam control is then given as $X_b(t) = V \cdot t - L_z \cdot \tan(\theta)(t) - \theta(0))$, with $V_b(t)$ and $H(t)$ as given as prescribed previously, in the scenario employing no scan control. Three differential equations are thus defined to be solved at each point along the trajectory for specifying the X-axis, Y-axis, and $\theta$ components of the E-beam trajectory, whereby the irradiation path is followed and the desired uniform E-beam dose is delivered.

The horizontal trajectory angle expression (2) above is only one example embodiment for carrying out the method of the invention of controlling E-beam scanning to compensate for vertical and horizontal motion in a manner that produces a desired dwell time and E-beam dose. As can be recognized, other scan compensation scenarios can be employed to produce the E-beam dwell time control. For example, translation of the E-beam in a direction parallel with the target part movement can be implemented by increasing or decreasing the speed of the part movement as needed to control the E-beam dwell time at points along the irradiation path. For most applications, it is found, however, to be preferable to control scan of the E-beam, rather than velocity of the target part, given that frequently the target part and associated tooling can be quite heavy and/or awkward to quickly maneuver.

Considering the application of expression (2) to obtain a uniform E-beam dose along the adhesive bond line 14 shown schematically in FIG. 4 to be lying between the tooling plate pairs, the initial E-beam trajectory angle, $\theta_0$, employed at the start of the adhesive bond line irradiation, is toward the left of the Z-axis reference line, i.e., in the negative $\theta$-direction, as shown in the figure. The trajectory angle then is directed toward the right of the reference line, i.e., in the positive θ-direction, in the steep regions of the bond line, between plate pairs 22 and 38, where $dY_b/dx \gg 1$. The trajectory angle is again controlled to the negative θ-direction for the shallow, near-horizontal region between plate pair 26, where $dY_b/dx < 1$, and the direction of the horizontal scan is then reversed in the intermediately sloped regions between plate pairs 24 and 28. Once the entire adhesive bond line of a part has been irradiated, the Y-axis translation control and trajectory angle control functions are reset for the next part to be irradiated.

As with the vertical translational control, $Y_b(X_b)$, described above, the angular E-beam control can be implemented using a preprogrammed angular control sequence that is precomputed and stored in the E-beam production unit controller for use during a process sequence. In addition, the preprogrammed control can be adjusted in real time during a process, to compensate for errors in the process, based on an implementation of E-beam position feedback, or can be computed and prescribed on-the-fly in real time during an E-beam scan based on E-beam position feedback. Feedback compensation of the control will be discussed in detail below.

Expression (2) above sets the maximum scan angle required to address all points on an irradiation path, whereby the range of scan angles to be imposed on the E-beam are defined. For many applications, it is preferred to minimize the range of required E-beam trajectory angles because at large angles, the beam can be distorted from a generally circular shape to a generally elliptical shape. In addition, at large angles the E-beam trajectory length is increased, resulting in a widening of the E-beam width at the target part. The utilization efficiency of the E-beam is severely degraded by the combination of these two effects. As the utilization efficiency is reduced, the correspondingly delivered E-beam dose is reduced, and at some low utilization efficiency, the E-beam dose can in fact be reduced to a level that is below a minimum required dose. Generally, for a wide range of applications, it is thus preferred that the maximum E-beam scan half-angle be less than about 45°, and even more preferably, be less than about 30°. The range of angles, Δθ, required for a given target part irradiation path is given as:

$$\Delta\theta = \theta(X_b = 2 \cdot a) - \theta(X_b = 0); \quad (3)$$

where (2·a) is the width of a target part. This angle range can be minimized by numerically evaluating expression (2) above for a value of the E-beam effective velocity, $V_1$, that corresponds to a minimum angle range. Table I below gives examples of optimum $V_1$ values, for several ellipsoidal irradiation paths like that generally shown in FIG. 4, that minimize the required range of control angles, or said another way, that minimize the horizontal scan width required for the entire irradiation path of the given target part to be irradiated. In the table, each path is defined by a major axis, a, and a minor axis, b, where $(X_b/a)^2 + (Y_b/b)^2 = 1$. The computations were carried out for an irradiation path of 2.54 cm in width, an E-beam gun-to-target separation, $L_z$, of 46 cm, and an E-beam diameter, $w_b$, of 3 cm. Also given in the table is the geometrical beam utilization efficiency, $F_i$, for each scenario, that being defined as the average fraction of the beam energy that is delivered to the irradiation path over the entire curve of the path.

TABLE I

| Major Axis a (cm) | Minor Axis b (cm) | Ratio of Effective Velocity to Conveyor Speed $V_1/V$ | Minimum Δθ (radians) | Average Efficiency $F_1$ |
|---|---|---|---|---|
| 30 | 80 | 1.67 | 0.26 | 0.65 |
| 40 | 60 | 1.4 | 0.37 | 0.70 |
| 50 | 50 | 1.32 | 0.35 | 0.73 |
| 60 | 40 | 1.25 | 0.37 | 0.74 |
| 80 | 30 | 1.17 | 0.28 | 0.74 |

Figure 5:
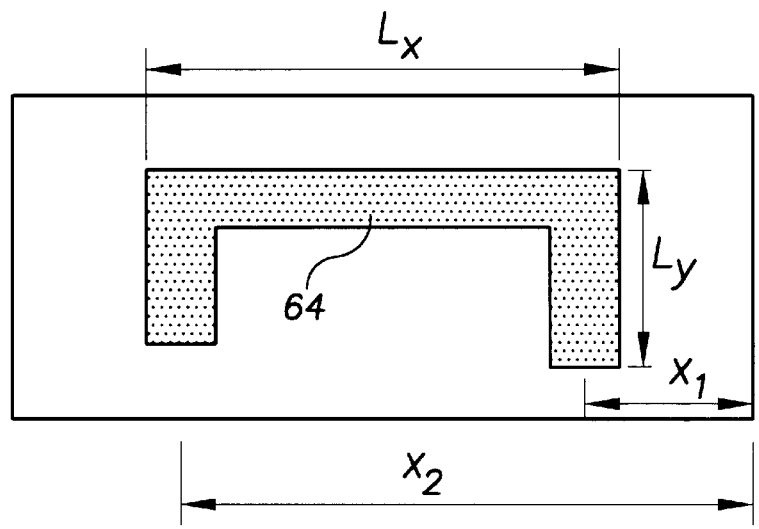
FIG. 5 is a schematic view of an example irradiation path to be irradiated in accordance with the invention.

Turning now to FIG. 5, there is shown an example irradiation path 64 having a section at an X-axis distance of $X_1$ and a section at an X-axis distance of $X_2$ that are both purely vertical. In accordance with the invention, to provide a uniform E-beam dose along both the vertical as well as the horizontal sections of the path, the speed at which the E-beam trajectory angle is changed is set to match the conveyor velocity, V, and the speed of the Y-axis translator is set to move the E-beam gun vertically at a rate that produces a dose equal to the dose of the non-vertical sections of the path. Here the trajectory angle control speed is set at $d\theta/dt = -V/L_z$, over the vertical sections and $d\theta/dt = (V-V_1)/L_z$ over the horizontal section of the path; the translator speed is set at $dH/dt = V_1$ at $X_b = X_1$ and is set at $dH/dt = -V_1$ at $X_b = X_2$, all to produce a uniform dose delivery to the entire irradiation path. The speed of the trajectory angle sweep and the translational rise or fall is thus determined by taking the derivatives of the time-dependent equations computed for the E-beam motion and described above.

For many irradiation paths that include vertical sections, the range of angles, Δθ, i.e., the horizontal span width, required to address all points of the path, may be partially or fully independent of the selection of effective scan velocity, $V_1$, and therefore not controllable by the expression (2) given above. For example, for the irradiation path 64 of FIG. 5, the minimum required range of angles depends only on the lengths of each of the sections in a relationship given as $\Delta\theta = \tan^{-1}[L_x \cdot L_y/(L_z \cdot (L_x + L_y))]$. This relationship also points out that an irradiation path that includes a large vertical section requires a large horizontal E-beam span width. But at large angles, the E-beam spot intersection with the path is found to be distorted from circular to elliptical, a resulting condition that decreases geometric efficiency of the beam irradiation. Accordingly, it is found that for some applications, imposition of a uniform E-beam dose requirement on an irradiation path having a large fraction of vertical path sections may not be practical; and accommodation of a non-uniform dose requirement may be preferable for this case for many applications.

It is also found that for some irradiation path geometries, no closed solution to expression (2) above can be found using a practical E-beam effective scan velocity, $V_1$. For example, for some irradiation path geometries, especially including large purely vertical sections, the E-beam trajectory angle, $\theta(X_b, Y_b)$, prescribed by the expression can, for some sections of the path, be greater than 90°. This is not a real solution because it directs the E-beam away from the target. Thus for these cases also, a uniform dose requirement on an irradiation path having a large fraction of vertical path sections may not be practical.

The invention addresses these and other scenarios in a large class of applications for which a precise, uniform E-beam dose along an irradiation path either is not required or is not easily implemented, but for which a range of E-beam doses can be accommodated along the irradiation path. Stated another way, the invention provides the ability to control the degree of E-beam dose uniformity delivered along an irradiation path. This is accomplished in accordance with the invention by controlling E-beam scan angle, $\theta$, to a degree that corresponds with the degree of E-beam dose uniformity desired.

As just explained, to produce a uniform E-beam dose along an irradiation path, the continuously variable angle function, $\theta(X_b, Y_b)$, described above is implemented as, e.g., expression (2) given above, requiring a corresponding continuously variable angle sweep rate, $d\theta/dt$. In contrast, in a scenario for accommodating a non-uniform E-beam dose that falls within a prescribed range of E-beam doses along an irradiation path, the E-beam scan angle and scan angle sweep rate are not precisely controlled to a specific angle and sweep rate at each path point, and instead are allowed to fluctuate within a range of angles and sweep rates that correspond to the allowable E-beam dose range.

It is found that E-beam dose range is inversely proportional to scan angle range; i.e., a wide range of scan angles is required to produce a narrow E-beam dose range while a relatively more narrow range of scan angles is required to produce a relatively wider E-beam dose range. An example that highlights this condition is provided by the geometry of FIG. 5. As explained above, the angular scan rate for the path is given as $d\theta/dt = -V/L_z$. Given the horizontal distance, $L_y$, and the effective E-beam velocity, $V_1$, the amount of time spent traversing a horizontal section is $L_y/V_1$. The angular scan width for the path is then correspondingly given as $\Delta\theta = V \cdot L_y/(V_1 \cdot L_z)$. Because E-beam dose, as given in expression (1) above, is inversely proportional to effective velocity, $V_1$, then it is seen here that a narrow angular scan width, $\Delta\theta$, results in a smaller E-beam dose delivered over the horizontal section of the path. The ratio of E-beam dose delivered to the horizontal and vertical sections is thus seen to be much larger in this case than if the angular scan width, $\Delta\theta$, were made larger, and the effective velocity, $V_1$, thereby made smaller.

This is an important correspondence because as explained earlier, minimization of the E-beam scan angle range is desired to minimize geometric distortion of the beam and to minimize increase of the E-beam width by minimizing its trajectory length. Thus, it is recognized in accordance with the invention that an accommodation of a range of E-beam doses instead of an imposition of a uniform E-beam dose requirement has the advantage of reducing the required E-beam scan angle range. Specifically, it is found that the E-beam scan angle range required to deliver an E-beam dose range having a maximum to minimum dose ratio, R, is reduced from the E-beam scan angle range required to deliver a uniform E-beam dose, i.e., a dose ratio where R=1, by a factor of R. In other words, if it is given that for uniform E-beam dose delivery the maximum allowable dose, $D_{max}$, and the minimum allowable dose, $D_{min}$, are the same, i.e., $D_{max}/D_{min} = R = 1$, and a corresponding E-beam scan angle range, $\Delta\theta$, is prescribed to meet the uniformity condition, then when the allowable dose range ratio, R, is set to some value greater than one, where $D_{max} > D_{min}$, it is found that the corresponding E-beam angle range is a reduced angle range, $\Delta\theta_r$, where:

$$\Delta\theta_r = \frac{1}{R} \Delta\theta. \quad (4)$$

Because most radiation-sensitive materials such as E-beam curable adhesive materials do not require a specific E-beam dose to adequately cure, and instead can be cured by any of a generally wide range of E-beam doses, this reduction in required E-beam scan angle range given in expression (4) can easily be accommodated in many E-beam processing applications. Specifically, it is found that most E-beam-curable polymer adhesive resins can accommodate an E-beam dose range of a factor of three, with typical required minimum curing E-beam doses of between about 30 kGy and about 60 kGy, and with typical required maximum curing E-beam doses of between about 120 kGy and about 300 kGy. As a result, the processing control parameters for these applications can be relaxed while still achieving a desired E-beam cure result. Specifically, the E-beam scan angle and scan angle sweep rate do not need to be continuously varied from point to point along an irradiation path, and the required E-beam scan angle range is reduced from that required to deliver a uniform dose by a factor of the dose range ratio, R.

A range of methods are contemplated by the invention for prescribing the E-beam scan angle and scan angle sweep rate to deliver an E-beam dose that resides within a prescribed dose range. In general, this is accomplished by first specifying the minimum dose, $D_{min}$, and the maximum dose, $D_{max}$, that can be accommodated along an irradiation path. Optionally, the maximum scan angle range and scan angle sweep rate can also here be specified; a default maximum scan angle range is otherwise set at about +/−45° based on beam utilization efficiency and beam extraction considerations. An irradiation path of interest is then examined to determine appropriate scan angle sweep rates that produce E-beam doses along the path that are within the prescribed E-beam dose range.

In one example technique, the E-beam scan angle is computed for the irradiation path point-by-point using the expression (2) given above. Then the path points are grouped into regions and the scan angles computed for each region's path points are averaged to produce an average scan angle for each region. Based on this average scan angle, a corresponding average scan angle sweep rate is then computed for each region in the manner described above. Then the E-beam dose, as given by expression (1) above, that would be delivered to each point in a region is computed for a scenario in which the average scan angle and average scan angle sweep rate for that region are applied to each point in the region.

Using either a simulation technique or an empirical measurement technique, with, e.g., the feedback system provided by the invention and described below, the E-beam dose range along each region is then investigated. If the computed E-beam dose is found to be too high at one edge of a given region and too low at the other edge of the region, then it is indicated that the region was defined to be too long, and should be divided into two plate regions, each with a distinct scan rate. If the computed E-beam dose at one edge of a given region is found to be too high (or too low), then the scan rate is scaled so that the E-beam dose at that region edge is equal to the maximum (or minimum) allowable E-beam dose. If this adjustment is found to push the E-beam dose delivered at the other edge of the region to be outside of the allowed E-beam dose range, then it is again indicated that the length of the region was defined to be too long, and the region should be divided into two regions. This process is completed for each specified section of the irradiation path until a set of discrete prescribed scan angle sweep rates are produced for the entire irradiation path. If the maximum required E-beam scan angle to accomplish the prescribed trajectory is then found to be larger than a desired maximum angle, the angular scan rate along those path sections designated to receive a minimum E-beam dose is then reduced until either the maximum scan angle is within the desired angular limit, or the range of E-beam dose along the path section is equal to the maximum allowable range.

In a further process provided by the invention for prescribing a discrete set of scan angle sweep rates, the slope of the irradiation path function, $Y_b(X_b)$ is numerically evaluated to set a corresponding scan angle sweep rate. Specifically, the irradiation path is segmented into regions and the average slope of path function over each region is evaluated. Then the E-beam scan angle and corresponding scan rate is computed based on the slope.

As an example of this implementation, referring to the adhesive bond line irradiation path 14 shown in FIG. 4, the bond line is segmented into three regions: two steep regions, near tooling plate pair 22 and tooling plate pair 38, each where $|dY_b/dX_b| \geq 2$; one shallow region, near tooling plate pair 26, where $|dY_b/dX_b| \leq 0.5$; and two intermediate regions, near tooling plate pair 24 and tooling plate pair 28, each where $|dY_b/dX_b| \approx 1$. Using the process steps just given, the E-beam scan angle sweep rate, $d\theta/dt$, is set as follows: $d\theta/dt=0$ for the two intermediate path regions; $d\theta/dt=-V_0/L_z$ for the two steep regions, where $V_0$; is the effective linear E-beam scan velocity in the direction parallel with the target part motion, V; and $d\theta/dt=\alpha V_0 L_z$ in the shallow section, where $L_z$ is the distance between the E-beam gun window and the target part.

The effective linear E-beam scan velocity, $V_0$, is selected such that the E-beam dose delivered at the steepest portion of curved segment is greater than the minimum required dose. For irradiation paths that include a single point of undefined slope, e.g., at the point (x,y)=(a, 0) in FIG. 4, the finite width of the E-beam, $w_b$, removes the singularity, and thus the value of the slope a distance, $w_b$, from the singularity can be employed to compute the required minimum dose. The value of the sweep variable, $\alpha$, is selected such that the E-beam scan angle smoothly transitions from one path region to the next. A numerical method implemented, e.g., in software, can be employed to search for the specific $V_0$ value that minimizes $\Delta\theta$, subject to a constraint that the E-beam dose along the path or path segment fall between the specified minimum and maximum allowable E-beam doses.

Table II below lists for five different elliptical irradiation paths the E-beam dose range ratio, R, for each path that is produced for a given ratio of effective linear E-beam scan velocity, $V_0$, in the direction of the moving target part to moving target part velocity, V. Each of the elliptical irradiation paths is defined by its major axis, a, in cm and its minor axis, b, in cm. Note that for the whole range of elliptical paths investigated, the dose range ratio is never greater than 2.5. Many E-beam curable polymers exhibit adequate characteristics when cured over a dose range ratio of less than three, and thus the Table II examples illustrate the broad applicability of the scan angle control provided by the invention.

TABLE II

| Major Axis a (cm) | Minor Axis b (cm) | $\frac{V_0}{V}$ | $\frac{D_{max}}{D_{min}} = R$ |
|---|---|---|---|
| 30 | 80 | 0.73 | 2.7 |
| 40 | 60 | 0.69 | 2.5 |
| 50 | 50 | 0.62 | 2.4 |
| 60 | 40 | 0.60 | 2.2 |
| 80 | 30 | 0.45 | 2.0 |

As explained above, the discretized E-beam scan angle and scan angle sweep rate prescribed for regions of an irradiation path can be preprogrammed to control the E-beam controller in accordance with a control program for implementation during an irradiation sequence. E-beam position feedback can in addition be employed to adjust the E-beam control in response to deviations from the expected E-beam position. E-beam position control feedback is provided in accordance with the invention using, e.g., the tooling plates as shown in FIGS. 2–4 as detector plates. The plates are formed of a conducting metal, e.g., aluminum or steel. When an E-beam hits one of the conducting detector plates charge is accumulated in the plate, whereby configuration of the plate in a circuit enables detection of current flow due to the charge accumulation in the plate.

Each detector plate is preferably sufficiently thick to prevent electrons from traversing entirely through the plate, to ensure that substantially all of the E-beam current impinging the plate is collected. For an E-beam energy of about 5 MeV, a steel plate of about 0.25 inches in thickness is sufficient to capture substantially the entire E-beam current. Typically some amount of secondary electron emission from a metal detector plate is stimulated by an impinging E-beam on the plate. This secondary electron emission is due to surface ionization of the plates. Such ionization, as well as primary electron backscatter, results in a reduced current flow from the detector plates. To eliminate this condition, each of the plates can be biased with respect to ground by a voltage of, e.g., between about 10 V and about 50 V, that suppresses secondary electron emission in the particular detector plate material being employed. This bias condition can be implemented in any suitable fashion, e.g., by mounting a suitable battery pack across each plate pair, or by mounting a battery in the transmitter 44 (FIG. 2) and connecting each plate pair in parallel across the battery by way of a wire 70 as shown in FIG. 2 for one plate pair 28. As can be recognized, the plates can be employed without a bias configuration if necessary or if preferred for a given application.

In one example detector plate configuration provided by the invention and illustrated in FIG. 4, an irradiation path to be followed by the E-beam is defined on the target part by the geometric placement of the detector plates. In a simplest configuration (not shown), only one pair of plates is provided, with a first plate located on one side of an irradiation path and the second plate located on the opposing side of the path. Alternatively, as shown in FIGS. 2–4, sets of plate pairs can be employed, with each plate electrically insulated from all other plates. This configuration provides additional feedback control parameters, as explained below.

In a multiple-pair configuration, the length of each pair of plates along the irradiation path they define preferably is selected based on the geometry of the path at the location of that plate pair. Specifically, each plate pair length corresponds to the length of a defined path control segment length as defined above. In one suitable configuration, each plate pair length is selected based on the angle of intersection of a tangent to the irradiation path at the center of the location of that pair and a line parallel to the direction of motion of the target part. For example, in FIG. 4, a line tangent to the center of the lowest plate pairs 22 and 38 will intersect the direction of target movement, which is horizontal, at about 10°; a line tangent to the center of the next higher plate pairs 24 and 28 will intersect the horizontal at an angle of about 30°, and a line tangent to the center of the highest plate pair 26 will intersect the horizontal at the top of the path.

As shown in FIG. 4, preferably the width of the irradiation path defined by the detector plates is slightly less than the beam width, $w_b$, expected for the E-beam-target placement.

In this configuration, some detectable current flow will be generated by the detector plates even when the E-beam is perfectly centered on the target irradiation path. An E-beam overlap of the plates of no more than about 20% is preferred, and as can be recognized, a particular E-beam overlap is best selected based on the electrical activity of the detector plate metal employed, the desired signal-to-noise ratio of the E-beam current signal, the desired feedback response rate, and other such considerations. The width of each of the plates in a direction perpendicular to the irradiation path is preferably at least as wide as the irradiation path to ensure good mechanical strength and to ensure complete interception of the E-beam should it completely stray off of the irradiation path.

It was described above with reference to FIG. 2 that various bracket configurations can be employed to maintain the detector plates in a desired configuration on a target part. In one convenient configuration, edge brackets are employed to hold each plate at an edge of the part. For some complicated irradiation paths, and for some target parts that do not include central apertures in the manner of the example automobile side panels shown, an edge of the part may not be located conveniently near to each plate to be supported. In such a situation, a bracket extension (not shown) can be configured to support more than one plate from a given edge.

As can be recognized, a bracket extension may in some instances cross over the desired irradiation path in the reach of the bracket to a centrally-located plate. For such cases and where the E-beam curing operation is an E-beam adhesive bonding operation, it is preferred that, e.g., the selected E-beam-curable adhesive be characterized as a dual curing material that can be cured by both E-beam irradiation and room temperature exposure, similar to, e.g., the adhesive described in the Skinner patent referenced above; here the exposed sections of the irradiation path are cured by the E-beam and the fraction of the path that is shadowed by the plate brackets is cured thermally at room temperature.

In one example feedback configuration in accordance with the invention, each plate is connected by a wire 70 as shown in FIG. 2 and as mentioned above, to a transmitter unit 44. While only one wire is shown in the figure for clarity, it is to be understood that each plate shown is to be connected to the transmitter unit by a wire. The E-beam current that is collected in each detector plate is sent to the transmitter unit, which in turn sends the current signals to the receiver 46 of the E-beam production unit 20. If desired, a wireless transmitter can alternatively be mounted at each plate and employed for delivering the current signal from each plate to the transmitter unit 44. Preferably, the conveyor belt 18 on which the target part and the tooling support reside is conducting and grounded such that the E-beam current collected through the irradiation path to the target part itself is drained from the target and from the tooling.

Figure 6A:
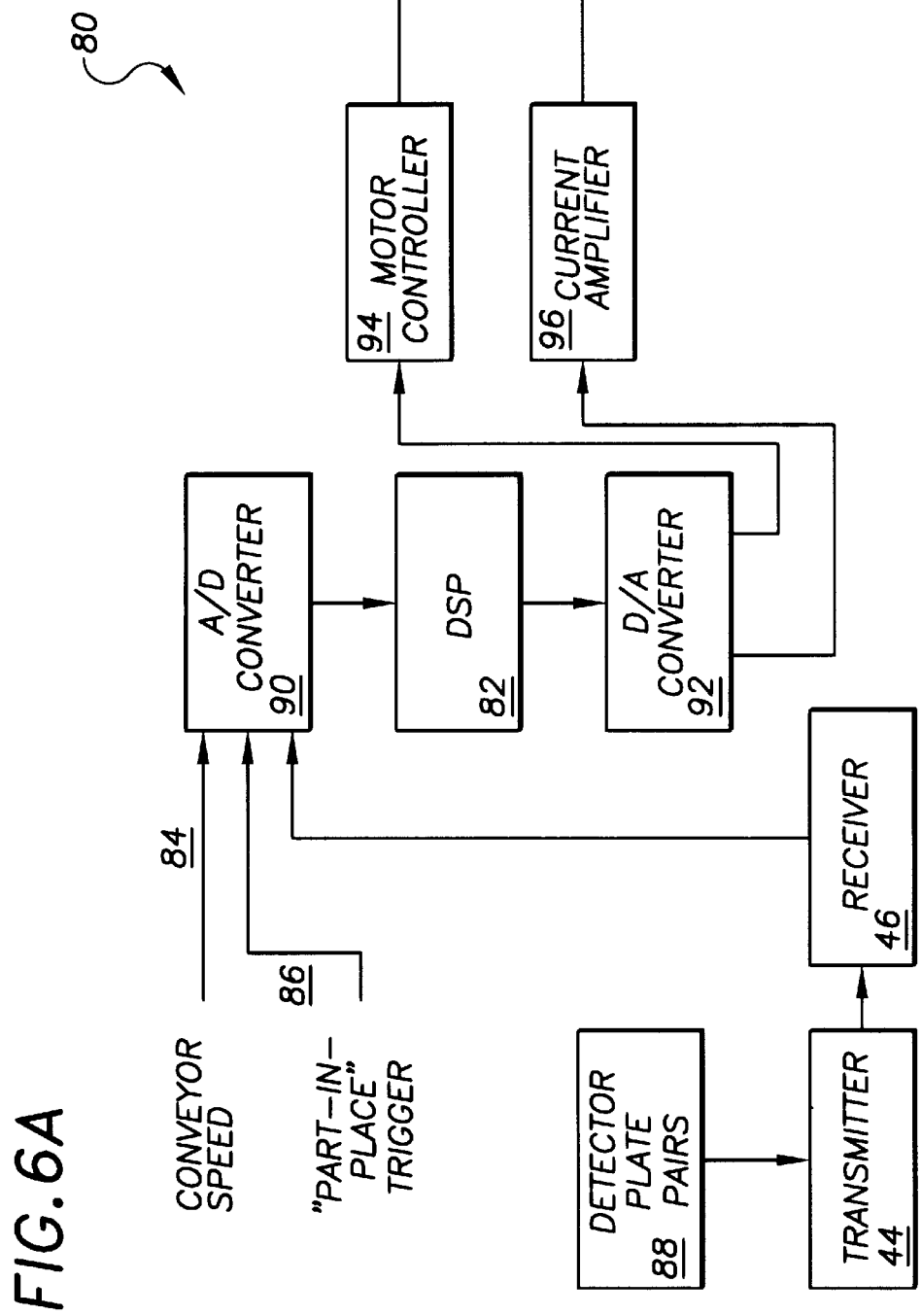
FIG. 6A is a block diagram of a first example feedback loop provided for controlling E-beam irradiation of an irradiation path in accordance with the invention.

Referring to FIG. 6A there is shown a first example feedback loop system provided in accordance with the invention. A digital signal processor (DSP) 82 is connected to receive from an encoder or other sensor an indication of the conveyor speed 84 of a conveyor on which a target part is being transported past the E-beam production unit. The DSP 82 is also connected to receive a "part-in-place" trigger signal 86 from, e.g., a mechanical or optical switch, indicating that a new target part has been transported to an indicated initiation point in front of the E-beam processing unit and is ready for commencement of E-beam irradiation. The conveyor speed and "part-in-place" signals are conventionally generated as analog signals and thus are digitized by an analog-to-digital converter (A/D) 90 before delivery to the DSP 82.

As the E-beam irradiation of an irradiation path on the target part proceeds, any interception of the E-beam by one of the detector plates in a configuration of one or more detector plate pairs 88 is transmitted by the transmitter 44 to the receiver 46. The received detector plate current signals are digitized by the A/D 90 and sent to the DSP 82 for processing.

The DSP 82 can be preprogrammed to control the E-beam propagation toward the target part as described above such that vertical translation of the E-beam gun directs the E-beam along a desired irradiation path. The DSP further can be preprogrammed to control the scan of the beam in a direction parallel to the direction of part movement in order to produce a desired uniform E-beam dose or a dose within a specified range of allowable doses along the irradiation path. In a control scenario for producing a uniform dose along a specified irradiation path, the DSP 82 is programmed to produce digital time-changing voltage control signals that are converted to analog voltage control signals by a digital-to-analog converter (D/A) 92 for controlling a drive stepper motor controller 94 and a current amplifier 96.

The stepper motor controller 94 in turn controls the stepper motor 56 configured to drive the E-beam vertical translation system, and the current amplifier 96 in turn controls the deflection coil 60 configured to directly control the E-beam trajectory scan angle. A suitable stepper motor and stepper motor controller is available from Bodine Electric Co., of Chicago, Ill., and a suitable current amplifier is available from Kepco Co., of Flushing, N.Y. A suitable DSP system, which includes an A/D and D/A, as well as a programmable processing unit, is available from Data Translation, of Marlborough, Mass. and from National Instruments of Austin, Tex.

At a time, t, after the commencement of the E-beam irradiation, the E-beam height is in this scenario controlled as $H=Y_b(X_b(t))$, where $X_b(t)=V \cdot t - L_z \cdot \tan\theta(t)$, and $\theta(t)$ is the desired E-beam scan angle computed based on expression (2) given above. Preferably, in order to increase the signal-to-noise ratio of the feedback system, a small oscillatory motion is added to the DSP control signal for the deflection coil 90 and the signals received from the detector plates are Fourier-transformed by the DSP to obtain the signal component at the oscillation frequency.

The detector plate signals received at the DSP are employed to adjust the stepper motor 56 and the deflection coil 60 in response to detected deviation of the E-beam from the preprogrammed path. This is accomplished by measuring the difference between the signals of the two detector plates in each detection plate pair. If the difference between the plate signals is zero, then it is indicated that the E-beam is on track along the prescribed irradiation path between the plates. If the difference between the plate pair signals is positive, then the stepper motor is controlled to raise the E-beam up, while if the difference between the plate pair signals is negative, then the stepper motor is controlled to lower the E-beam downward. If the angular scan rate is continuously variable, then for primarily vertical sections the scan rate is reduced to move the beam to the left, and is increased to move the beam to the right.

The relative amount of adjustment of E-beam vertical position versus E-beam scan angle depends for each point along an irradiation path on the slope of the path at that point, and is weighted as $\Delta H/\Delta\theta = L_z \cdot dY_b/dX_b$. Accordingly, in large-slope sections of an irradiation path, the E-beam scan angle is primarily adjusted, whereas in horizontal regions of the irradiation path the E-beam vertical position is primarily adjusted.

As can be recognized, the DSP can be programmed to impose any desired $Y_b(X_b(t))$ irradiation path function, as well as any $\theta(t)$ function, within practical limits, as described above. If a precisely uniform dose is not required along the irradiation path, then a discretized $\theta(t)$ function that provides a range of E-beam doses along the irradiation path, as explained above, can be programmed. If no E-beam dose uniformity is required, then the deflection coil 60 can be neglected and the E-beam scan angle set at 0° for the entire irradiation path, whereby the E-beam dose at each point of the path is location-dependent, as explained above. If feedback control is not required or is not practical for a given application, the DSP need only receive signals for the conveyor speed and the "part-in-place" trigger and then run a preprogrammed control scenario to control the deflection coil and/or the stepper motor. If E-beam control along an irradiation path is to be accomplished purely based on feedback of E-beam location, then the DSP preprogramming is correspondingly set to an on-the-fly mode.

Figure 6B:
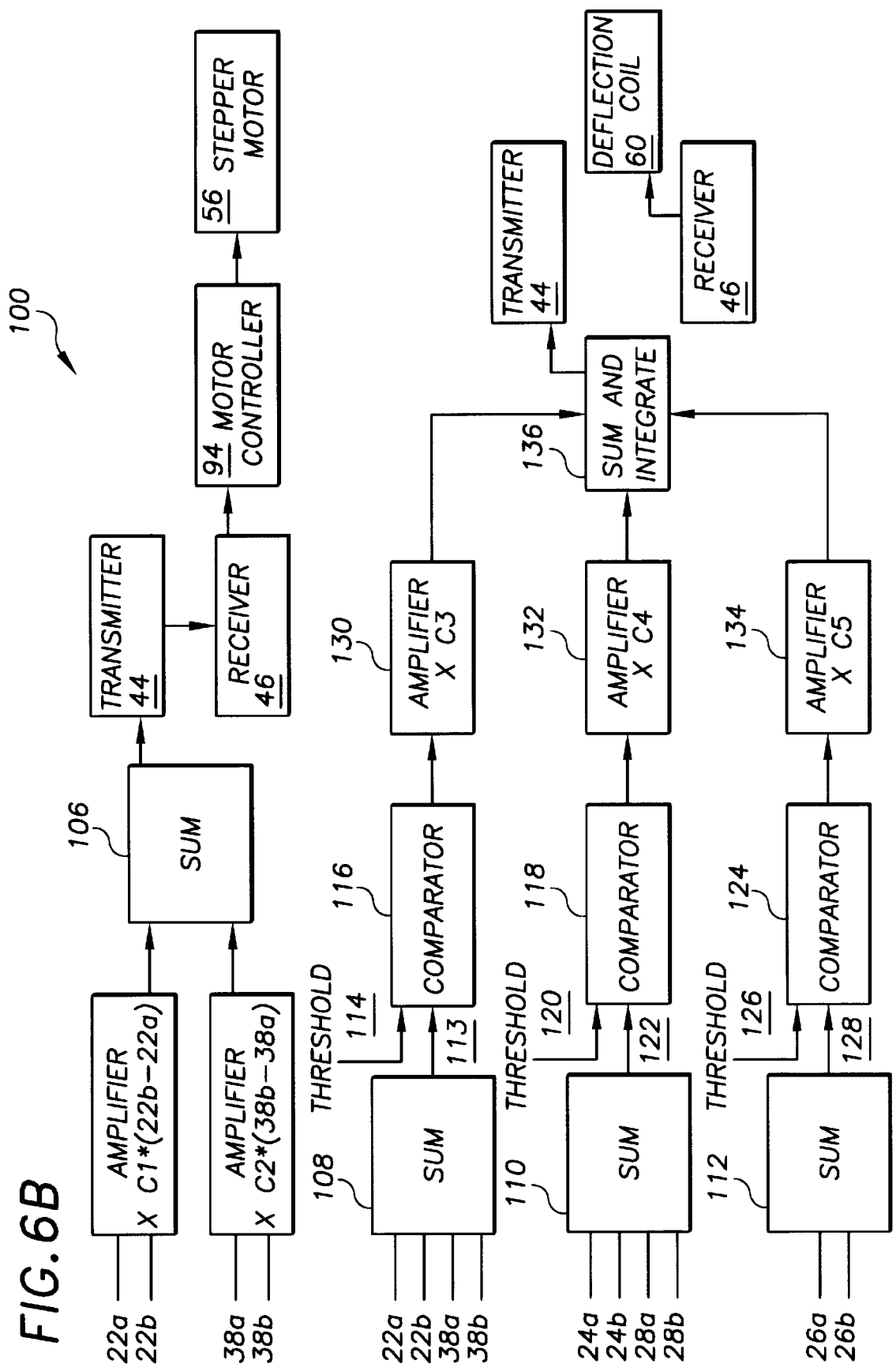
FIG. 6B is a block diagram of a second example feedback loop provided for controlling E-beam irradiation of an irradiation path in accordance with the invention.

In an alternative to a preprogrammed DSP, the invention contemplates a custom hardware system that implements desired control scenarios and feedback scenarios. For example, as shown in FIG. 6B, in a custom hardware feedback system 100 designed to implement detector feedback for the example irradiation path 14 of FIG. 4, the current signals from each of the detector pair plates are processed by a corresponding amplifier circuit designed to produce a difference signal indicative of the difference between each pair's lower plate and each pair's upper plate, multiplied by a corresponding constant. In the example configuration shown, signals from two of the detector plate pairs, 22, 38, are shown, each to be processed by a corresponding amplifier 102, 104, respectively. It is to be understood that although not shown, the other detector plate pair signals are also processed by corresponding amplifier circuits. The multipliers $C_1$, $C_2$ selected for the amplifiers are preferably based on the slope of the irradiation path in the region of the corresponding plate pair; relatively larger slope regions require correspondingly larger difference multiplier values to amplify what may be only a small difference between the signals, while relatively flatter regions require correspondingly smaller difference multiplier values. The amplified difference values are then summed by a summing circuit 106, and delivered to the transmitter 44 for transmission to the receiver 46 at the E-beam production unit 20, for control of the motor controller 94 and the stepper motor 56. This configuration enables an on-the-fly control of the E-beam vertical position without a preprogrammed control sequence.

Likewise, as shown in FIG. 6B, feedback for the E-beam scan angle control can be implemented in custom hardware. In one example, the hardware is configured to implement three prespecified, discrete $\theta(t)$ scan angles that produce a corresponding designated range of allowable E-beam doses over the example irradiation path of FIG. 4. In this hardware configuration, the sum of the detector plate signals for all the detector plates located in similarly-sloped regions of the irradiation curve are summed; each grouping of plate pairs corresponds to the selected segmenting of the irradiation path into regions along which a common scan angle control value is to be implemented.

As explained above, for the example irradiation path of FIG. 4, in one three-angle control scenario the leading and trailing plate pair regions, the intermediate plate pair regions, and the shallow central region are each designated with a discrete scan angle control function. Accordingly, the signals from the leading plate pair 22 and the trailing plate pair 33 are summed by a first summing circuit 108; the signals from the first intermediate plate pair 24 and the second intermediate plate pair 28 are summed by a second summing circuit 110; and the signals from the plate pair in the shallow region of the curve are themselves summed by a summing circuit 112.

Each of the summed signals is then compared with a corresponding threshold value to determine if the E-beam is located near to any of the plate pairs whose signals are employed in that comparison. For example, the sum signal 113 from the first sum circuit 108 is compared with a first threshold value 114 by a comparator circuit 116; if the sum signal 113 exceeds the threshold signal, then it is indicated that at the time, the E-beam is located in a region of the irradiation path along either the first plate pair 22 or the last plate pair 38. A second comparator 118 compares the sum signal 122 from the pairs of intermediately-located pair plates with a second threshold 120; and a third comparator 124 compares the sum signal 128 from the shallow plate pair with a third threshold 126.

The outputs of each of the comparators are each amplified by a multiplier selected to implement the E-beam scan angle control designated for the corresponding plate pair region. For example, given the three-angle control scenario for the example irradiation path of FIG. 4 described above, the first amplifier 130 implements a multiplier, $C_3$, that is large and negative, to sweep the E-beam angle rapidly to the right, in the $-X$ direction, for the path regions near plate pairs 22 and 38. The second amplifier 132 implements a multiplier, $C_4$, that is very small or zero, to effectively turn off the E-beam scan angle sweep in the intermediate path regions near plate pairs 24 and 28. The third amplifier 134 implements a multiplier, $C_5$, that is small and positive to sweep the E-beam angle slowly to the left across the shallow path region near plate pair 266.

The amplified signals are then summed and integrated by corresponding summing and integrating circuits 136, which sends the summed and integrated signal to the transmitter 44 for transmittal to the E-beam production unit receive 46 and deflection coil 60. As can be recognized, the amplifiers, summers, and integrators can alternatively be located at the E-beam production unit receiver rather than at the tooling transmitter in order to reduce the amount of electronics required on the tooling, but with a corresponding required increase in the amount of information to be sent by the transmitter to the receiver.

EXAMPLE I

A portion of the example irradiation path 14 and the detector plate pair 24 configured at that region of the path, as shown in FIG. 4, was fabricated to demonstrate an ability to monitor and control E-beam position along the path. Two aluminum plates, each about one inch-wide, about four inches-long, and about 0.125 inches-thick were mounted on a non-conducting polymer surface and spaced about one inch-apart from each other. An E-beam of about 1.5 MeV in energy and having a beam diameter of about two inches was directed at the plates and oscillated through a scan angle sweep at about 1 Hz by the magnetic deflection coil of the E-beam gun.

Current collected by the detector plates was sent by coaxial cable to the 50-ohm input of an oscilloscope having DSP capability. The average current and amplitude of the sinusoidal component of the oscilloscope signal was measured and found to be characterized by a signal-to-noise ratio of more than about 30. It was found that when the E-beam was scanned through the detector plate pair the E-beam position indicated by the sinusoidal component did correspond correctly to a condition of E-beam position between the plates. This indicated that effective scan control as well as dose delivery control could be implemented with the plates.

EXAMPLE II

The strength of an E-beam-curable adhesive was tested as a function of E-beam dose delivered to the adhesive to determine an allowable dose non-uniformity for the example irradiation path 14 of FIG. 4. Loctite 334 adhesive, from the Loctite Corp. of Newington, Conn., was applied to multiple three inch-long, one inch-wide, 0.125 inch-thick lap-shear samples of PVC plastic prepared according to ASTM standard D 1002. The tensile test samples were configured in an aluminum fixture and held with a clamping pressure of about 10 psi while being irradiated by an E-beam to a range of doses at an E-beam energy of about 1.3 MeV. The irradiated samples were then tested for tensile strength using the ASTM standard test procedure. This testing showed that the tensile strength was between about 2000 psi and about 2500 psi over a dose range of about 5–30 MR. The ratio of maximum to minimum E-beam dose for this range is six. This indicated that for a wide range of elliptical irradiation paths, such as those paths itemized in Table II, a wide dose non-uniformity can be accommodated, even larger than those indicated in the table, and yet produce an acceptable E-beam curing result.

A range of alternatives are provided by the invention. For example, the E-beam vertical control can be implemented as a scan control using, e.g., magnetic coils, or can be implemented with some system alternative to the linear translation control example given. Similarly, the scan control of the E-beam can be implemented as a translation using a stepper motor system, rather than being implemented as the angular control of the examples. The invention thus is not limited to a particular X-axis, Y-axis, or angular deflection scenario; any deflection implementation that constrains the E-beam to follow a desired irradiation path and that controls the E-beam in the direction of target part motion to deliver a desired E-beam dose is contemplated by the invention.

In addition, the example vertical translation control system can be provided with a second degree of freedom, in the ±Z direction, such that both ±Y and ±Z control of the E-beam is achievable. This dual translation mode enables the increase or decrease of E-beam width on the target part as desired, and is particularly useful for an irradiation curve having a varying width, or for a target part having multiple irradiation paths of various widths. The E-beam gun can also be provided with an additional angular degree of freedom to enable the E-beam to be directed at a propagation angle measured with respect to the X-Z plane in FIG. 3. This additional angular freedom enables the E-beam intersection with a target part to be maintained perpendicular to the irradiation path on the target part for parts that are oriented at an angle with respect to the X-Y plane in FIG. 3. Each such additional degree of freedom in the motion of the electron gun head can be controlled by simple modifications or additions to the detector plates described above and will require corresponding signals in the feedback control system. The E-beam can further be controlled to not only follow a prescribed scan angle but also to translate in the direction parallel with that of the scan angle. This control arrangement reduces the required parallel distance of E-beam travel by the E-beam dose range ratio, R, described above.

The transmitter, receiver, and control units provided with the feedback system of the invention can be implemented in any suitable manner such as the example components previously described. A convenient combination of standard hardware components, software, firmware, and custom hardware, e.g., custom digital logic, can be employed as found suitable for a given application. A computer and input/output interface with display and keyboard can be provided at the controller to accommodate user-input of a control function to be programmed, and to enable display and printout of the irradiation control as it is carried out. The feedback detector plates can be configured in any convenient manner that enables their placement to define a prescribed irradiation path between pairs of plates. The transmitter can be connected to the E-beam production unit receiver by a wiring cable, rather than in a wireless configuration, if such is more convenient.

The E-beam bonding example used in the description is not meant to be limiting in its example configuration. In other example configurations contemplated by the invention, the adhesive bond line is a junction between two parts that is exposed to an E-beam; here the E-beam is not required to traverse one or more parts to impinge the adhesive bond line. In general, an assembly to be bonded can include multiple junctions to be bonded, with various of the junctions located at internal positions requiring E-beam traversal through one or more materials of the assembly, and other of the junction located at external positions that do not require E-beam traversal through the assembly materials.

The above description highlights the many advantages of the selective E-beam irradiation process techniques provided by the invention. The techniques provide the ability to implement control of an E-beam to follow a prescribed irradiation path as well as to deliver a desired degree of E-beam dose uniformity along the path. The techniques are flexible in that they accommodate discrete dose control scenarios, and can be adapted for a wide range of E-beam process applications. It is recognized, of course, that those skilled in the art may make various modifications and additions to the E-beam irradiation techniques described above without departing from the spirit and scope of the present contribution to the art. Accordingly, it is to be understood that the protection sought to be afforded hereby should be deemed to extend to the subject matter of the claims and all equivalents thereof fairly within the scope of the invention.

I claim:

1. A method for selectively irradiating a designated portion of a target material with a beam of electrons, comprising the steps of:

moving the target material at a substantially constant velocity in one direction along a path that is intersected by the electron beam;

translating the electron beam in a direction transverse to the direction of target material movement to intersect the designated portion of the target material; and scanning the electron beam in a direction parallel with the direction of target material movement to control the electron beam dwell time at points along the designated portion based on target material movement and electron beam transverse translation to deliver a specified electron beam dose to points along the designated portion of the target material, wherein different non-zero electron beam dwell times are applied at points along the designated portion.

2. A method for selectively irradiating a designated portion of a target material with a beam of electrons, comprising the steps of:

moving the target material at a substantially constant velocity in one direction along a path that is intersected by an electron beam;

translating the electron beam in a direction transverse to the direction of target material movement to intersect the designated portion of the target material; and scanning the electron beam in a direction parallel with the direction of target material movement to control the electron beam dwell time at points along the designated portion based on target material movement and electron beam transverse translation to deliver a substantially uniform electron beam dose along the designated portion of the target material, wherein different non-zero electron beam dwell times are applied at points along the designated portion.

3. A method for selectively irradiating a designated portion of a target material with a beam of electrons, comprising the steps of:

moving the target material at a substantially constant velocity in one direction along a path that is intersected by an electron beam;

translating the electron beam in a direction transverse to the direction of target material movement to intersect the designated portion of the target material; and scanning the electron beam in a direction parallel with the direction of target material movement to control the electron beam dwell time at points along the designated portion based on target material movement and electron beam transverse translation to deliver an electron beam dose that comprises any electron beam dose falling within a specified range of allowable electron beam doses, wherein different non-zero electron beam dwell times are applied at points along the designated portion.

4. The method of claim 3 further comprising the steps of:

detecting actual electron beam intersection position with the target material; and adjusting the electron beam translation in response to the detected intersection position to maintain intersection of the electron beam with the designated portion of the target material.

5. The method of claim 3 further comprising the steps of:

detecting actual electron beam intersection position with the target material; and adjusting the electron beam scanning in response to the detected intersection position to maintain delivery of the specified electron beam dose to the designated portion of the target material.

6. The method of claim 3 wherein the step of scanning the electron beam comprises controlling a scan rate of the electron beam in a direction parallel with the direction of target material movement.

7. The method of claim 6 wherein the step of controlling the electron beam scan rate comprises imposing a fixed scan rate selected from a set of specified, fixed scan rates, on the electron beam, each specified, fixed scan rate imposed at more than one point along the designated portion of the target material.

8. The method of claim 7 wherein the step of imposing a fixed scan rate comprises imposing each specified, fixed scan rate on a corresponding region of the designated portion of the target material.

9. The method of claim 8 wherein each of the specified, fixed scan rates is selected to minimize the ratio of maximum electron beam dose to minimum electron beam dose delivered to points along the corresponding region for that scan rate.

10. The method of claim 9 wherein each of the fixed scan rates is selected to reduce velocity of the electron beam relative to the target material in large-slope regions of the designated portion and is selected to increase velocity of the electron beam relative to the target material in small-slope regions of the designated portion, where a large-slope region is defined as a region for which a line tangent to the region slope intersects a line parallel with the direction of the target material movement at an acute angle greater than about 60°, and where a small-slope region is defined as a region for which a line tangent to the region slope intersects a line parallel with the direction of the target material movement at an acute angle of less than about 30°.

11. The method of claim 3 wherein the step of scanning the electron beam comprises controlling a maximum angle to which the electron beam can be scanned, the maximum angle selected based on a specified electron beam dose uniformity along the designated portion of the target material.

12. The method of claim 11 wherein the step of controlling the maximum electron beam scan angle comprises selecting a maximum electron beam scan angle for a specified electron beam dose uniformity that is defined by an allowable electron beam dose range ratio, R, of maximum allowable electron beam dose, $D_{max}$, to minimum allowable electron beam dose, $D_{min}$, resulting in a maximum electron beam scan angle, $\Delta\theta_{max}$, is specified as:

$$\Delta\theta_{max} = \frac{1}{R}\Delta\theta_{max\text{-}uniform};$$

where $\Delta\theta_{max\text{-}uniform}$ is a maximum electron beam scan angle required to deliver a substantially uniform electron beam dose along the designated portion of the target material.

13. A method for selectively irradiating a designated portion of a target material with a beam of electrons, comprising the steps of:

moving the target material at a substantially constant velocity in one direction along a path that is intersected by an electron beam;

translating the electron beam in a direction transverse to the direction of target material movement to intersect the designated portion of the target material;

processing feedback signals produced by sensors located on the target material in a selected spaced relationship with the designated portion of the target material to determine actual electron beam intersection position with the target material; and adjusting the electron beam translation in response to the detected intersection position to maintain intersection of the electron beam with the designated portion of the target material.

14. A method for selectively irradiating a designated portion of a target material with a beam of electrons, comprising the steps of:

positioning sensors in a selected spaced relationship with the target material designated portion in a configuration that defines the designated portion as a path between the sensors;

moving the target material at a substantially constant velocity in one direction along a path that is intersected by an electron beam;

translating the electron beam in a direction transverse to the direction of target material movement to intersect the designated portion of the target material;

processing feedback signals produced by the sensors to determine actual electron beam intersection position with the target material; and adjusting the electron beam translation in response to the detected intersection position to maintain intersection of the electron beam with the designated portion of the target material.

15. The method of claim 14 wherein the step of positioning the sensors in the selected spaced relationship comprises positioning the sensors on the target material in a configuration that defines the designated portion as a path between the sensors.

16. The method of claim 15 wherein the step of moving the target material comprises moving the target material along a path that is a distance from a source of electrons, the distance selected to produce a generally circular intersection of the electron beam with the designated path on the target material, the electron beam intersection being characterized by a beam diameter that is larger than a width of the designated path on the target material.

17. The method of claim 15 wherein the step of processing feedback signals produced by the sensors comprises determining the difference in electron current level between two sensors in a designated pair of sensors.

18. A method for selectively irradiating a designated portion of a target material with a beam of electrons, comprising the steps of:

moving the target material at a substantially constant velocity in one direction along a path that is intersected by an electron beam;

translating the electron beam in a direction transverse to the direction of target material movement to intersect the designated portion of the target material;

processing feedback signals produced by sensors located in a selected spaced relationship with the designated portion of the target material to determine actual electron beam intersection position with the target material; and scanning the electron beam in a direction parallel with the direction of target material movement in response to the detected electron beam intersection position to control the electron beam dwell time at points along the designated portion to deliver a specified electron beam dose to points along the designated portion of the target material.

19. A method for selectively irradiating a designated portion of a target material with a beam of electrons, comprising the steps of:

moving the target material at a substantially constant velocity in one direction along a path that is intersected by an electron beam;

processing feedback signals produced by sensors located on the target material in a selected spaced relationship with the designated portion of the target material to determine actual electron beam intersection position with the target material; and translating the electron beam in a direction transverse to the direction of target material movement, in response to the detected electron beam intersection point, to intersect the designated portion of the target material.

20. A method for selectively irradiating a designated portion of a target material with a beam of electrons, comprising the steps of:

moving the target material at a substantially constant velocity in one direction along a path that is intersected by an electron beam;

processing feedback signals produced by sensors located in a selected spaced relationship with the designated portion of the target material to determine actual electron beam intersection position with the target material;

translating the electron beam in a direction transverse to the direction of target material movement, in response to the detected electron beam intersection point, to intersect the designated portion of the target material; and scanning the electron beam in a direction parallel with the direction of target material movement in response to the detected electron beam intersection position to control the electron beam dwell time at points along the designated portion to deliver a specified electron beam dose to points along the designated portion of the target material.

21. A method for bonding together two materials by selectively irradiating a designated bond line of electron beam-curable adhesive, located at a junction of the two materials, with a beam of electrons, comprising the steps of:

moving the two materials at a substantially common and constant velocity in one direction along a path that is intersected by an electron beam;

translating the electron beam in a direction transverse to the direction of material movement to intersect the designated adhesive bond line; and scanning the electron beam in a direction parallel with the direction of material movement to control the electron beam dwell time at points along the designated adhesive bond line to deliver a specified electron beam dose to points along the designated adhesive bond line.

22. The method of claim 21 wherein the step of scanning the electron beam comprises scanning the electron beam to control the electron beam dwell time at points along the designated adhesive bond line to deliver a substantially uniform electron beam dose along the designated adhesive bond line.

23. The method of claim 21 further comprising the steps of:

detecting actual electron beam intersection position with the designated adhesive bond line; and adjusting the electron beam translation in response to the detected intersection position to maintain intersection of the electron beam with the designated adhesive bond line.

24. The method of claim 21 further comprising the steps of:

detecting actual electron beam intersection position with the adhesive bond line; and adjusting the electron beam scanning in response to the detected intersection position to maintain delivery of the specified electron beam dose to the designated adhesive bond line.

25. The method of claim 21 wherein the step of scanning the electron beam comprises scanning the electron beam to control the electron beam dwell time at points along the designated adhesive bond line to deliver an electron beam dose that comprises any electron beam dose falling within a specified range of allowable electron beam doses.

26. The method of claim 21 further comprising the step of controlling the energy of the electron beam to produce an electron beam having energy sufficient to substantially traverse one of the materials to impinge a designated adhesive bond line located between the materials.

* * * * *